W. DALTON.
FLEXIBLE DRIVING MECHANISM.
APPLICATION FILED MAY 8, 1908.

902,523.

Patented Oct. 27, 1908.

2 SHEETS—SHEET 1.

WITNESSES
James C. Herron
S. R. Bell

INVENTOR
Wm Dalton
by Snowden Dill
Att'y.

W. DALTON.
FLEXIBLE DRIVING MECHANISM.
APPLICATION FILED MAY 8, 1908.
902,523.
Patented Oct. 27, 1908.
2 SHEETS—SHEET 2.
FIG. 2.
FIG. 3.
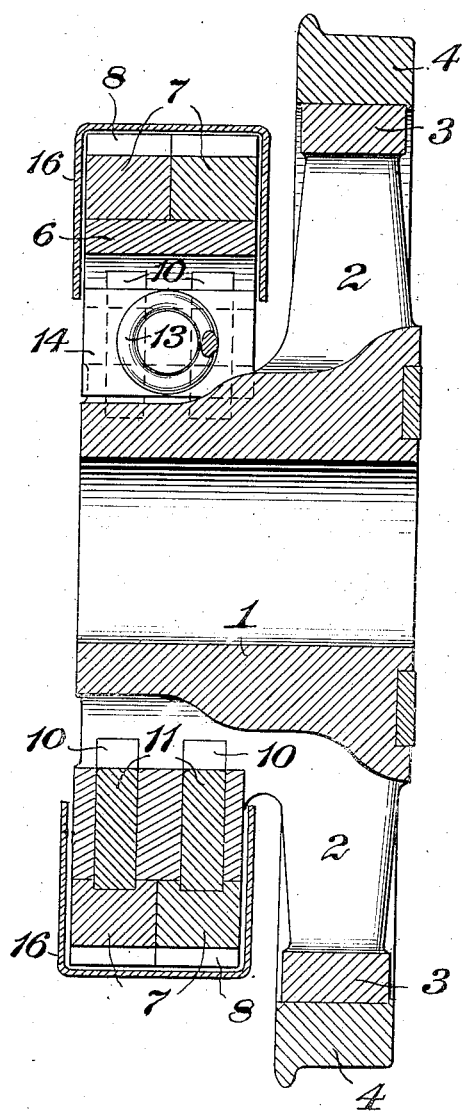
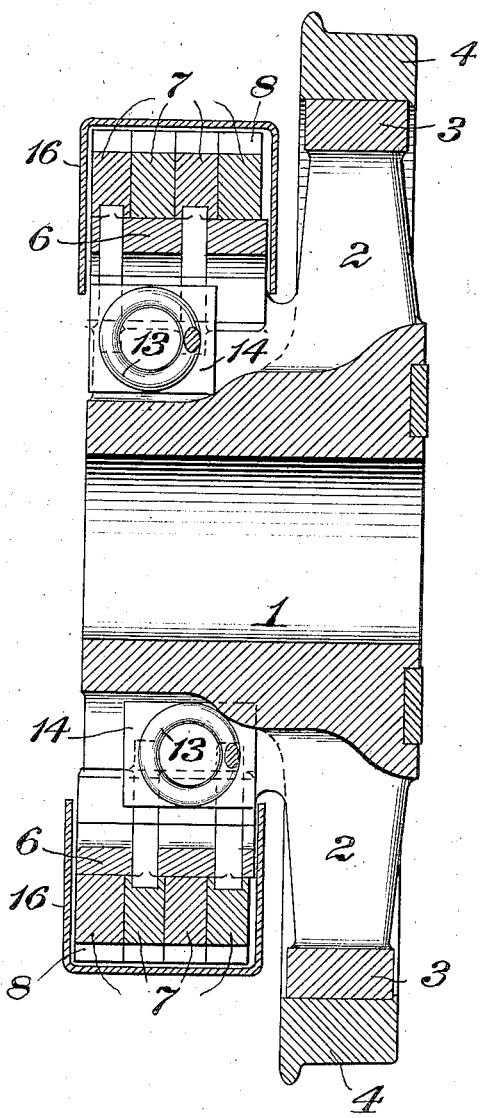
WITNESSES
INVENTOR
Wm Dalton
Att'y.

UNITED STATES PATENT OFFICE.

WILLIAM DALTON, OF SCHENECTADY, NEW YORK, ASSIGNOR TO AMERICAN LOCOMOTIVE COMPANY, OF NEW YORK, N. Y., A CORPORATION OF NEW YORK.

FLEXIBLE DRIVING MECHANISM.

No. 902,523. Specification of Letters Patent. Patented Oct. 27, 1908.

Application filed May 8, 1908. Serial No. 431,688.

*To all whom it may concern:*

Be it known that I, WILLIAM DALTON, of Schenectady, in the county of Schenectady and State of New York, have invented a certain new and useful Improvement in Flexible Driving Mechanism, of which improvement the following is a specification.

My invention, while relating more particularly to gear wheels which transmit power from electric motors to axles of electric locomotives, is equally applicable in other installations, and its object is to provide a driving mechanism, of simple and comparatively inexpensive construction, which shall not involve the use of bolt or rivet connections, and in the operation of which blows or shocks shall be effectively cushioned and the application of power to the driving member shall be made independently in a plurality of planes transverse to the axis of rotation of the latter.

The improvement claimed is hereinafter fully set forth.

Figure 1:
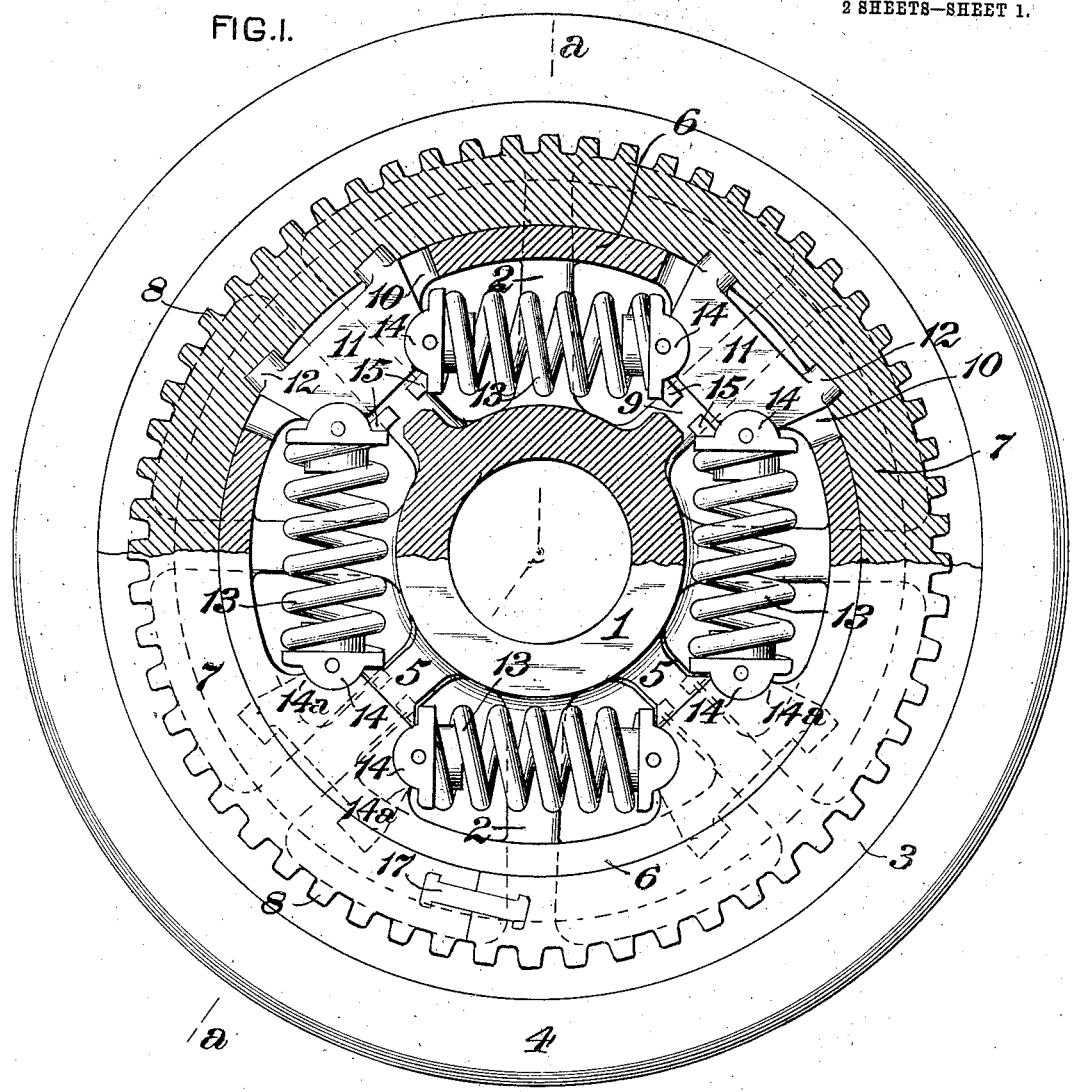
Figure 4:
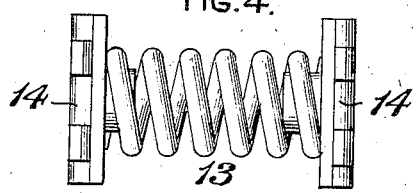

In the accompanying drawings: Figure 1 is a rear view, partly in elevation and partly in section, of an electric locomotive driving wheel, illustrating an application of my invention; Fig. 2, a transverse section through the same, on the line $a$ $a$ of Fig. 1; Fig. 3, a similar section, showing the driving member as comprising a greater number of separate parts or sections, and; Fig. 4, a plan view of a spring and its seats, detached.

In electric locomotives having motors suspended on the axles, difficulty has been experienced in providing gears of proper and sufficient strength to effect the transmission of the driving power. Motors for this service are usually fitted with a pinion on one end of the motor shaft, and, after the motor shaft bearings and axle bearings become worn, when power is applied to the motor, the pinion tends to assume an angular position, relatively to the locomotive axle which it rotates, and, in doing so, to cause its teeth to bear only, or more strongly, at one end of the gear teeth. As the driving power is applied very quickly from the pinion to the gear body and axle, by the electric motor, it has the effect of a series of blows, and it has been found in practice that these blows on one corner or end of the gear tooth will cause it to break under pressure less than that which the calculated strains indicate that it should sustain. The importance, in increasing the life of the gears, by cushioning the blows referred to and by substantially equalizing the transmission of power from the pinion to the gear tooth throughout the length of the latter, instead of at or adjoining one of its ends only, will be manifest to those skilled in the art, and my invention enables these results to be satisfactorily accomplished.

My invention is herein exemplified as applied in connection with, and for the purpose of transmitting driving power to, a driving wheel of an electric locomotive, which comprises an inwardly extended hub, 1, radial arms or spokes, 2, connecting said hub with a rim, 3, and a flanged tire, 4, inclosing the rim and secured thereto in any suitable manner. The driving wheel is fixed upon an axle of the locomotive, as in ordinary practice, and while properly therein termed a "driving" wheel, because effecting the movement of the locomotive, will be herein referred to as the "driven" member, in contradistinction to a sectional or divided gear, through which the power by which it is rotated is applied, which gear has the capacity of circumferential movement independently of the driving wheel, as hereinafter described, and will be herein designated as the "driving" member.

The hub, 1, of the driven member, is extended inwardly beyond that portion of its length from which the spokes, 2, project, and its inwardly extended portion is provided with arms or spokes, 5, the outer ends of which are connected by an annular rim or gear seat, 6, the periphery of which is finished to a true cylindrical surface. A sectional driving member, consisting of two or more adjoining annular gear bands, 7, the periphery of each of which is provided with gear teeth, 8, is fitted, with the capacity of a limited degree of circumferential movement, on the gear seat, 6, the teeth of said gear bands being adapted to engage those of a pinion upon a motor shaft, which is not shown, and by which the gear bands are rotated in the ordinary manner. An opening or recess, 9, is formed in each of the spokes, 5, and slots, 10, corresponding in number with the gear bands, are milled in the adjoining portions of the gear seat, 6. An abutment block, 11, is fitted in each of the slots, 10, said abutment blocks having lugs, 12, on their outer sides which engage corresponding holes in the gear bands, and being segmentally recessed on their ends, adjoining their inner sides. Helical springs, 13, are located in the spaces between the spokes, 5, each of said springs being disposed tangentially to the hub, 1, and bearing, at its ends, on spring seats, 14, the opposite sides of which are curved in conformity with, and abut against, the segmental end recesses of the adjoining abutment blocks, 11, and against similarly formed bearing faces, 14ª, on the spokes, 5. The width of the spring seats, 14, is substantially equal to that of the gear seat, so that they bear on the abutment blocks of both or all of the gear bands, and they are provided with lugs, 15, which fit against the ends of the openings, 9, and prevent lateral displacement of the spring seats and springs.

As shown in Fig. 3, the driven member comprises four gear bands, instead of two as in Figs 1 and 2, the construction being otherwise similar to that above described, except that in the case of Fig. 3, two opposite springs would be used for one pair of gear bands, and two other springs for the other pair. It will be obvious that, if preferred, a single gear band may be used, instead of two or more, as shown.

My invention is not limited in application to a driving mechanism in which spur gearing is used, as it may, without variation of structural or operative principle, be applied in connection with other classes of gearing, or with a driving member consisting of a single or sectional pulley.

In the operation of the appliance, when power as applied to rotate the driving member in either direction, as by the engagement of the teeth of the pinion on a motor shaft with those of the gear bands, the latter will tend to move, independently of the driven member, circumferentially on the gear seat which is fixed on the latter, and in such movement to compress the springs, between the abutment blocks, at one end, and the bearings on the spokes of the driven member, at the other. The driving member will therefore move independently of the driven member, until the springs have been sufficiently compressed to resist further independent movement, whereupon the driven member will be rotated, the compression of the springs serving to cushion any shocks or blows in the transmission of the driving power. The division of the gear bands into a plurality of sections insures the application of power to their teeth with substantial uniformity throughout their aggregate length, and obviates the liability to breakage which, as before stated, obtains where they engage those of the pinion only, or more strongly, at or near one end.

I claim as my invention and desire to secure by Letters Patent:

1. In a driving mechanism, the combination of a driven member, a driving member, fitted with the capacity of independent circumferential movement thereon, a plurality of abutment blocks engaging the driving member, and springs interposed between said abutment blocks and bearing thereon and on the driven member.

2. In a driving mechanism, the combination of a driven member, a sectional driving member consisting of adjoining annuluses, fitted with the capacity of independent circumferential movement on the driven member, a plurality of abutment blocks engaging said annuluses, and springs interposed between said abutment blocks and bearing thereon and on the driven member.

3. In a driving mechanism, the combination of a driven member, an annular seat thereon, a driving member, fitted with the capacity of independent circumferential movement on said seat, a plurality of abutment blocks fitting in slots in said seat and engaging the driving member, and springs interposed between said abutment blocks and bearing thereon and on the driven member.

4. In a driving mechanism, the combination of a driven member, an annular seat thereon, a driving member, fitted with the capacity of independent circumferential movement on said seat, a plurality of abutment blocks fitting in slots in said seat and engaging the driving member, spring seats abutting against said abutment blocks and against the driven member, and springs interposed between and bearing on said spring seats.

5. In a driving mechanism, the combination of a driven member, an annular seat thereon, a driving member, fitted with the capacity of independent circumferential movement on said seat, a plurality of abutment blocks fitting in slots in said seat and engaging the driving member, spring seats abutting against said abutment blocks and against the driven member, lugs on said spring seats engaging the driven member and preventing lateral displacement of the spring seats, and springs interposed between and bearing on the spring seats.

6. In a driving mechanism, the combination of a driven member, an annular seat thereon, a driving member, fitted with the capacity of independent circumferential movement on said seat, a plurality of abutment blocks fitting in slots in said seat and having lugs fitting holes in the driving members, said abutment blocks being laterally insertible and removable in and from the driven member, spring seats abutting against the ends of said abutment blocks and against the driven member, lugs on said spring seats engaging the driven member and preventing lateral displacement of the spring seats, and tangentially located springs interposed between and bearing on the spring seats, said springs and spring seats being laterally removable from the driven member by manual compression of the springs.

7. In a driving mechanism, the combination of a driven member in the form of a wheel having a hub laterally elongated beyond an outer plane of its tread and an annular rim or gear seat connected by arms or spokes to the elongated portion of the hub, a driving member in the form of a peripherally toothed gear band, fitted with the capacity of circumferential movement on the gear seat, a plurality of abutment blocks entering recesses in the arms and fitting in slots in the gear seat, said abutment blocks engaging the inner side of the gear band, spring seats abutting against the ends of the abutment blocks and against the arms of the hub, and having lugs abutting laterally against said arms, and tangentially located springs interposed between, and bearing at their ends on, the spring seats.

8. In a driving mechanism, the combination of a driven member in the form of a wheel having a hub laterally elongated beyond an outer plane of its tread and an annular rim or gear seat connected by arms or spokes to the elongated portion of the hub, a driving member in the form of a plurality of laterally adjoining peripherally toothed gear bands, fitted with the capacity of circumferential movement on the gear seat, a plurality of abutment blocks entering recesses in the arms and fitting in slots in the gear seat, said abutment blocks engaging the inner sides of the gear band sections, spring seats abutting against the ends of the abutment blocks and against the arms of the hub and having lugs abutting laterally against said arms, and tangentially located springs interposed between, and bearing at their ends on, the spring seats.

WM. DALTON.

Witnesses:
S. W. TYLER,
F. T. MARKS.